C. C. ALLEN & E. J. GEORGE.
INSTRUMENT FOR TESTING THE ABNORMALITIES OF THE RECTI MUSCLES OF THE HUMAN EYES.
APPLICATION FILED FEB. 13, 1917.
1,292,671.
Patented Jan. 28, 1919.
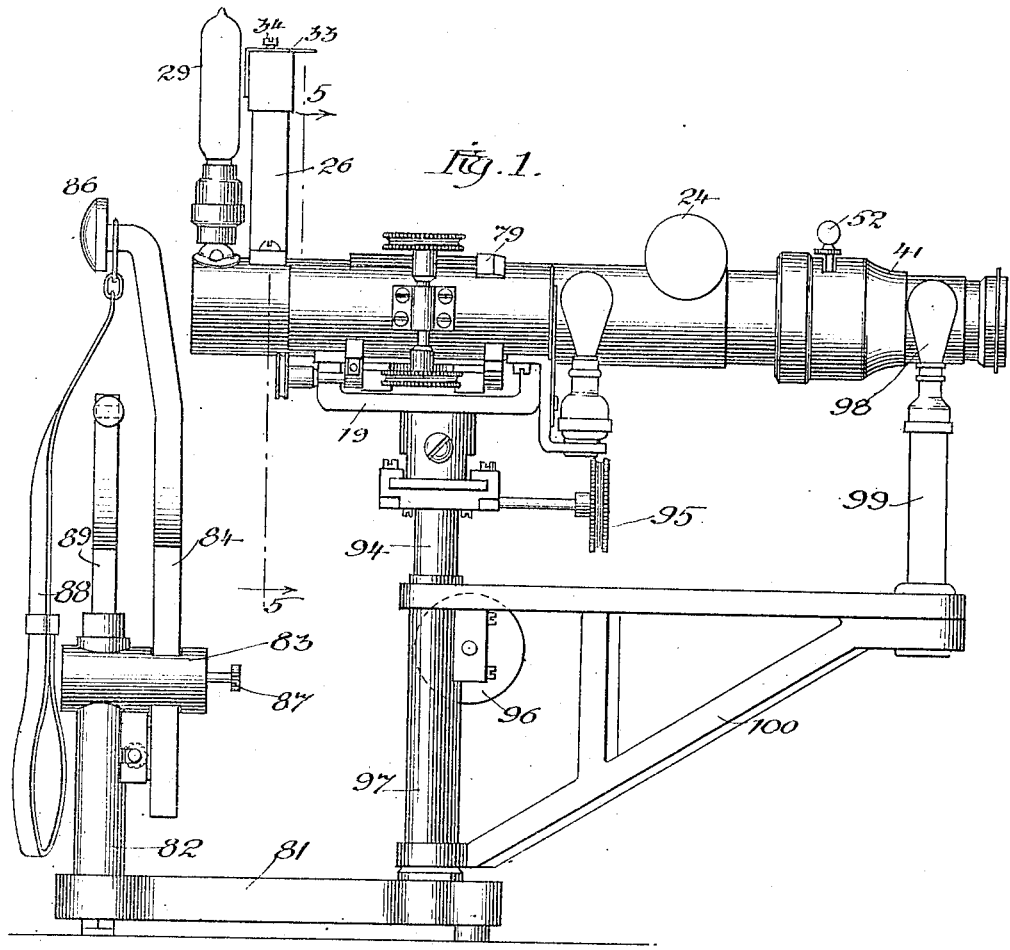

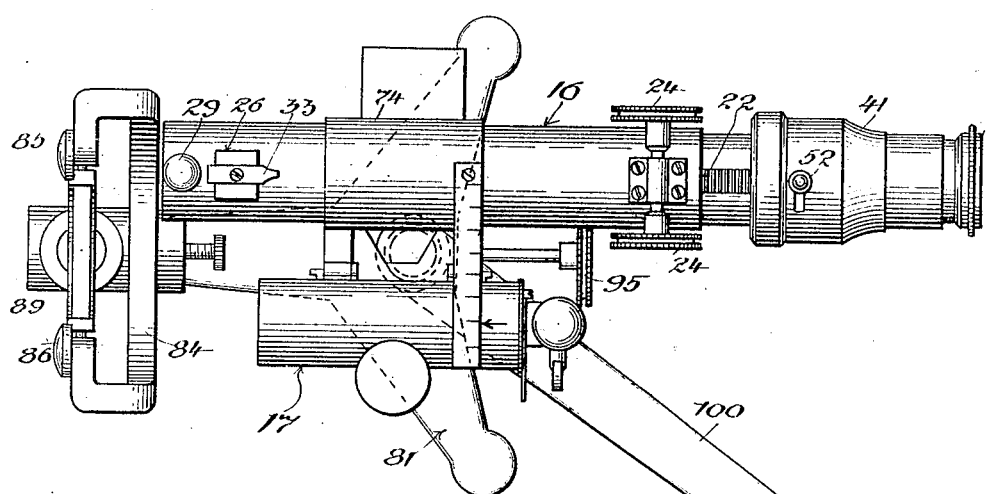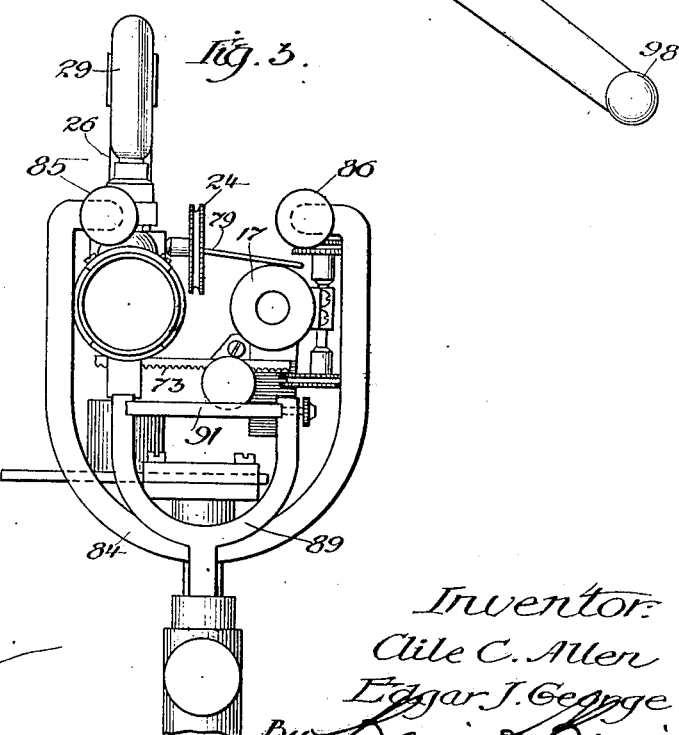

C. C. ALLEN & E. J. GEORGE.
INSTRUMENT FOR TESTING THE ABNORMALITIES OF THE RECTI MUSCLES OF THE HUMAN EYES.
APPLICATION FILED FEB. 13, 1917.
1,292,671.
Patented Jan. 28, 1919.
5 SHEETS—SHEET 3.
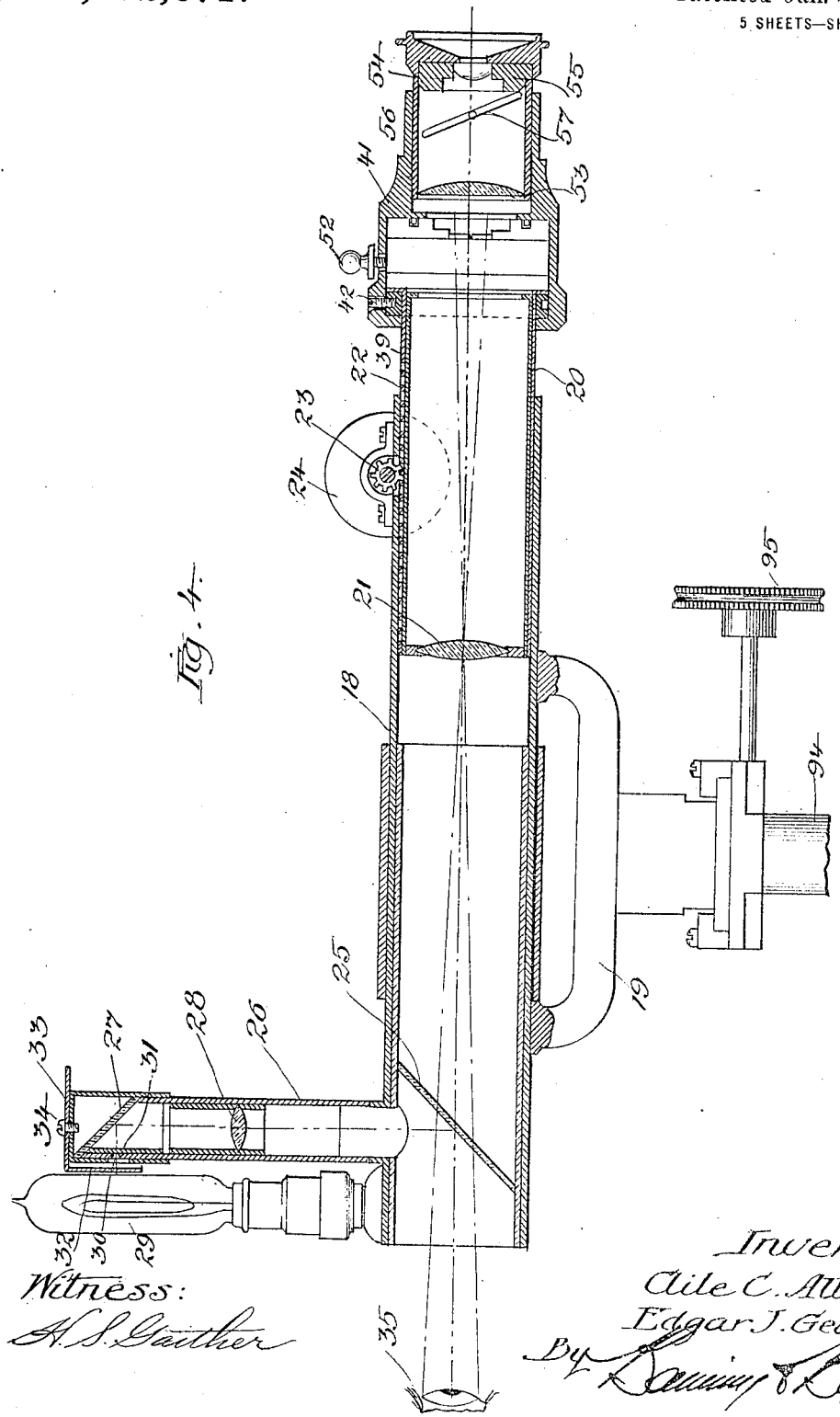
Witness:
H. S. Gaither
Inventors
Aile C. Allen
Edgar J. George
By Banning & Banning
Attys.

C. C. ALLEN & E. J. GEORGE.
INSTRUMENT FOR TESTING THE ABNORMALITIES OF THE RECTI MUSCLES OF THE HUMAN EYES.
APPLICATION FILED FEB. 13, 1917.
1,292,671.
Patented Jan. 28, 1919.
5 SHEETS—SHEET 4.
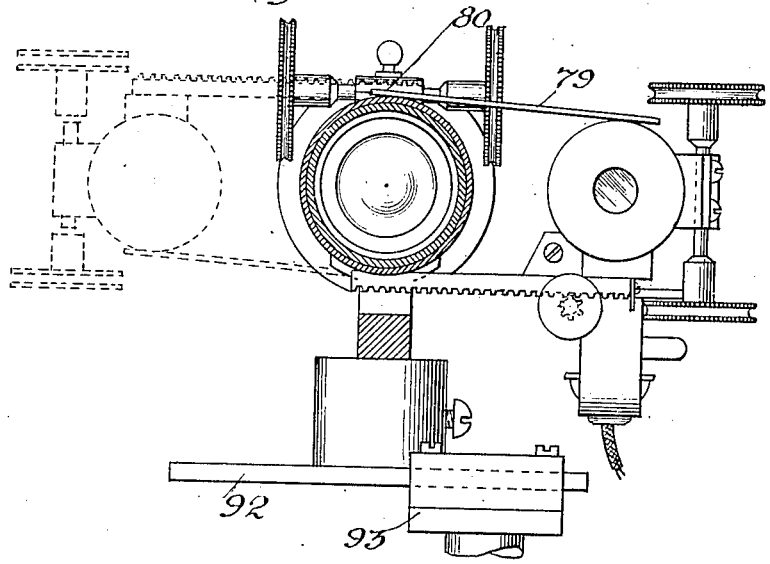
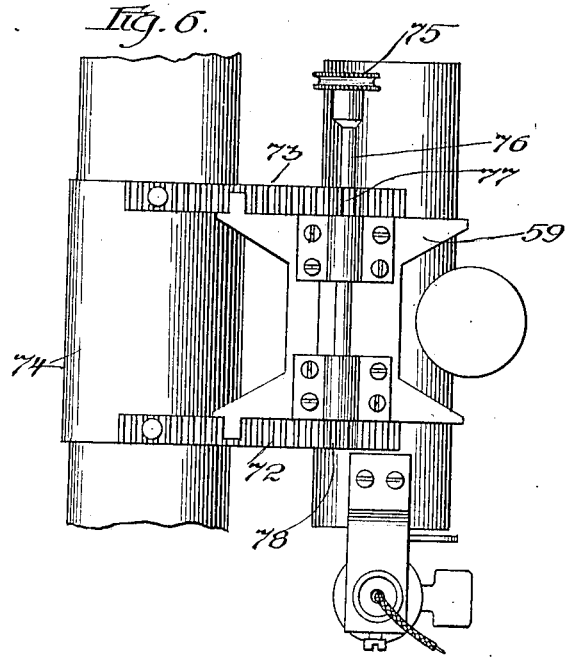

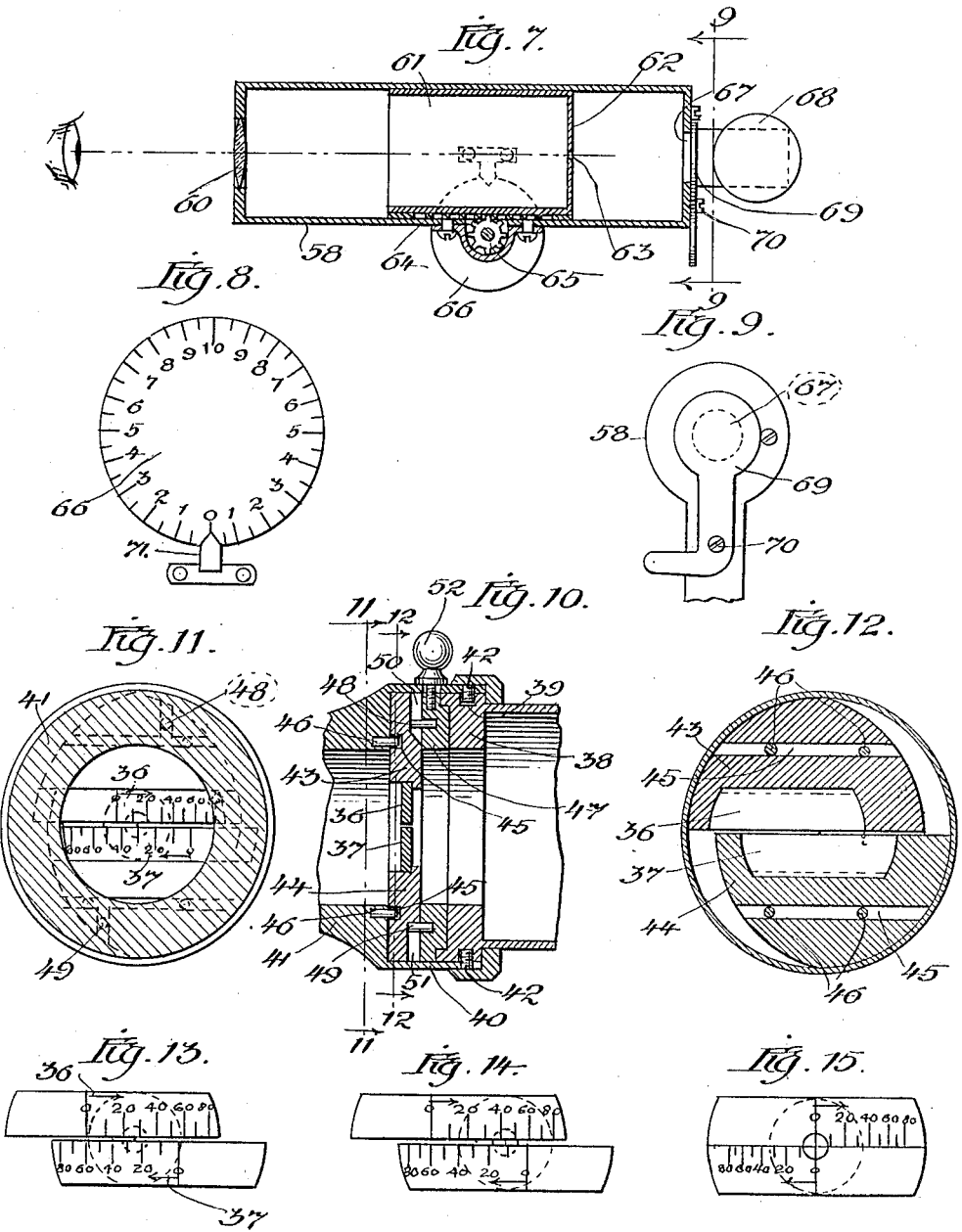

UNITED STATES PATENT OFFICE.

CLILE C. ALLEN AND EDGAR J. GEORGE, OF CHICAGO, ILLINOIS, ASSIGNORS TO GEO. S. JOHNSTON COMPANY, OF CHICAGO, ILLINOIS, A CORPORATION OF ILLINOIS.

INSTRUMENT FOR TESTING THE ABNORMALITIES OF THE RECTI MUSCLES OF THE HUMAN EYES.

1,292,671.   Specification of Letters Patent.   Patented Jan. 28, 1919.

Application filed February 13, 1917. Serial No. 148,437.

*To all whom it may concern:*

Be it known that we, CLILE C. ALLEN and EDGAR J. GEORGE, both citizens of the United States, and both residing at Chicago, in the county of Cook and State of Illinois, have invented certain new and useful Improvements in Instruments for Testing the Abnormalities of the Recti Muscles of the Human Eyes, of which the following is a specification.

The present invention has to do with certain improvements in instruments for testing the human eye to ascertain the existence or absence of certain abnormalities, and to analyze the kind and degree of the same. These abnormalities include any tendency of the eyes to cross or diverge, and in fact any tendency of the visual axes of the eyes to lie on axes which are other than parallel when the accommodation is relaxed. The lack of parallelism may be found to lie within a substantially horizontal plane. However, in many cases the lack of parallelism is found to exist in other directions. For example, there is sometimes a tendency for the eyes to assume visual axes occupying unequal amounts of divergence from a horizontal plane.

The cumulative or combined effect of abnormalities of the recti muscles existing within one or both of the eyes is to produce a combined or cumulative variation between the directions of the two visual axes. In order to completely analyze or diagnose this muscular abnormality, it is quite necessary not only to ascertain the combined or cumulative divergence or discrepancy, but also to analyze the same, so that it may be compensated for, and, in many cases, corrected by a suitable surgical operation.

The lateral movements of the eye-ball in a horizontal plane are accomplished by the internal and external recti muscles, and the up and down movements of the eye-ball are accomplished by the superior and inferior recti muscles. When the eye-ball is turned outwardly, the internal rectus muscle lengthens and the external rectus muscle shortens, and a converse action takes place when the eye-ball is turned inwardly. When the eye-ball is raised, the superior rectus muscle shortens and the inferior rectus muscle lengthens, and a converse action takes place when the eye-ball is lowered.

In order for the visual axes of the eyes to maintain parallelism with relaxed accommodation, the shortening and lengthening tendencies of all of these muscles must be such that no abnormal effort is required to realize this condition. If the internal rectus muscle of either eye be abnormally long, or if the external rectus muscle of either eye be abnormally short, there will be a tendency for the eye-balls to relatively assume such positions that their visual axes will diverge within a horizontal plane, thus producing exophoria. Conversely, if either of the external recti muscles be abnormally long, or if either of the internal recti muscles be abnormally short, there will be a tendency for the eye-balls to relatively assume such positions that their visual axes will converge or cross in a horizontal plane, thus producing esophoria. If either of the superior recti muscles be abnormally long, or if either of the inferior recti muscles be abnormally short, then the corresponding eye-ball will be turned downwardly an abnormal amount, thus producing either right or left hyperphoria, depending upon whether the visual axis of the right eye or left eye assumes the higher position.

As was previously explained, a complete analysis of the abnormalities will include not only the ascertainment of the relative directions of the visual axes, but also an analysis of the movements occasioned by the different muscles, so as to enable the surgeon to make the necessary corrections, if desired, in order to rectify the abnormality. The cumulative error occasioned by all of the abnormalities may be ascertained by finding out the amount of unbalance or lack of parallelism between the visual axes when the accommodation is relaxed. This may be done, for example, by first causing the visual axis of one of the eyes to lie on a given line, simultaneously noting the position of the cornea. The visual axis of the other eye may then be brought into a position parallel to the original position of the visual axis of the first eye, and then, the accommodation of the eyes being relaxed, the movement of the cornea of the first eye will be an indication of any abnormal tendency of the first eye to move away from a position of parallelism with respect to the visual axis of the second eye. This tendency will be a measure of the unbalance as between the visual axes. The movement thus measured may be in either horizontal or vertical direction, or in some other direction depending upon the cumulative error of one or more muscles.

This cumulative measurement, however, does not of itself inform the oculist as to the necessary corrections to be made by way of operation. In order to secure this information, it is necessary to find out which one or more of the recti muscles is abnormal.

There is a definite angle of the visual axis in each direction for each eye beyond which the muscles will not fixedly retain such eye. For example, in each individual it is possible to turn the left eye outwardly to assume a line of vision along a visual axis whose direction or angle or divergence can not permanently exceed more than a certain value. It will be possible for the patient momentarily to divert his eye to a greater angle, but when so diverted his eye will naturally snap back or restore itself to the angle which can be fixedly maintained.

If the patient's eyes be separately tested to determine the angle of fixation in each direction, both horizontally and vertically, then the oculist will be supplied with sufficient information to enable him to determine accurately just what changes or corrections must be made in the various muscles in order to restore the eyes to normal condition. For example, if the oculist finds that the angle of fixation of one eye is abnormally large on the nasal side and normal on the temporal side, information will be available to the effect that the internal rectus muscle shall be lengthened, and the amount by which said angle of fixation exceeds the normal for a person of the age and conditions of the patient under test will be a measure of the amount of correction by way of lengthening which should be made in such muscle.

In those cases where the amount of muscular abnormality is relatively small, the same may be corrected by way of prisms in the eye-glass or spectacle lenses. When the correction is made in this way, the total amount of prism in both lenses should be equal and opposite to the amount of unbalance between the visual axes of the two eyes. This total amount of correction by way of prism may be made in one lens, or it may be divided between the two lenses as a matter of convenience. However, when the correction is made by the use of prisms, said correction is simply for the purposes of changing the direction of light rays, so that they may enter each eye in the direction corresponding to the abnormal visual axes.

Where, however, it is desired to actually remove the abnormality of the patient, or where said abnormality is unduly large, so that it can not be corrected or compensated by the use of prisms of usable thickness and weight, it becomes necessary to resort to a surgical operation either for the lengthening or shortening of the proper muscles in the correct amount to secure an actual removal of the abnormality.

One of the objects of the present invention is to provide a method for testing the patient's eyes for the purpose of ascertaining the amount of muscular abnormality, and also for the purpose of analyzing said abnormality to see wherein the same consists, so that the desired correction may be made either for its physical removal or compensation.

Another object of the invention is to provide a simple form and construction of instrument for enabling the oculist to completely analyze the muscular conditions existing in both eyes.

Other objects and uses will appear from a detailed description of the invention which consists in the features of construction and combinations of parts hereinafter described and claimed.

Referring to the drawings:

Figure 1 shows a side elevation of one construction of instrument for enabling the oculist to carry out the desired tests for the purpose of ascertaining and analyzing the muscular abnormalities;

Fig. 2 shows a plan view corresponding to Fig. 1;

Fig. 3 shows a fragmentary front elevation corresponding to Figs. 1 and 2;

Fig. 4 shows a longitudinal section through the observation tube, said section being on an enlarged scale, and showing diagrammatically the path of travel of rays of light;

Fig. 5 shows a section taken on line 5—5 of Fig. 1, looking in the direction of the arrows, Fig. 5 being on enlarged scale, and also shows by means of dotted lines the manner in which the fixation tube may be thrown to either side of the observation tube as desired, according to whether the right or left eye of the patient is under observation;

Fig. 6 shows a rack and pinion arrangement, whereby separation of the optic axes of the observation and fixation tubes may be adjusted to exactly correspond to the separation between the eyes of the patient;

Fig. 7 shows a longitudinal section through the fixation tube;

Fig. 8 shows diagrammatically the graduated wheel for moving the aperture plate of the fixation tube to a position such that the accommodation of the eye of the patient observing said aperture plate is completely relaxed;

Fig. 9 shows in enlarged detail a section taken on the line 9—9 of Fig. 7, looking in the direction of the arrows;

Fig. 10 shows in enlarged detail a longitudinal section through the centering mechanism whereby the centered and shifted positions of the image of the cornea of the eye under observation are indicated;

Fig. 11 shows a section taken on the line 11—11 of Fig. 10, looking in the direction of the arrows;

Fig. 12 shows a section taken on the line 12—12 of Fig. 10, looking in the direction of the arrows;

Fig. 13 shows diagrammatically the positions of the scales of the centering mechanism for the purpose of indicating the initial or centered position of the cornea of the eye under observation;

Fig. 14 shows a view corresponding to Fig. 13, with the exception that the visual axis of the eye does not correspond with the optic axis of the observation tube, and the image of the cornea is consequently shifted from the centered position of the scale shown in Fig. 13; and Fig. 15 shows diagrammatically a modified form of centering device; in which both portions of the scale are rigidly fixed with respect to each other.

Referring now to the drawings, and particularly to Figs. 1, 2, 3, and 4, the instrument therein illustrated is provided with what we shall term an observation tube 16 and a fixation tube 17 whose optic axes are parallel. The observation tube comprises a fixed tubular member 18 carried by a bracket 19, and a telescoping member 20 working within the fixed member 18. The telescoping member 20 carries a plus lens 21 in its forward end. Furthermore, said telescoping member may be worked back and forth within the fixed member 18 by means of a rack 22 and pinion 23 operated by a hand wheel 24. In the forward portion of the fixed tubular member 18 there is mounted a plane transparent glass reflector 25, the same lying at an angle of substantially 45 degrees to the horizontal. Directly in front of the position of this plane glass reflector there is a vertical tube 26 built into the upper portion of the fixed tubular member 18. In its upper end, this member 26 is provided with a plane glass reflector 27 whose function is to reflect light from the aperture 30 directly downward through the tubular member 26 and against the plane glass reflector 25 at an angle of 45 degrees. Within the tubular member 26 is also mounted a plus lens 28.

The beam of light, impinging upon the reflector 27 and by it directed downward through the tubular member 26, is conveniently delivered from a lamp 29 through a small orifice 30. A piece of colored glass 31, such as a ruby glass, serves to give the beam of light a distinctive color. A shutter 32 mounted on an arm 33 pivoted at the point 34 serves as a convenient means for cutting off the beam of light at desired times. By positioning the lens 28 its focal length from the aperture 30, light rays emerging from the lens 28 will be parallel and the aperture 30 will appear to the eye 35 to be located along the optic axis of the observation tube.

The eye under observation is properly centered and positioned with respect to the observation tube in the manner to be presently explained more in detail. It will suffice to state at this point, however, that the visual axis of said eye is centered to coincide with the optic axis of the observation tube.

Mounted on the extreme end portion of the telescoping member 20 is a centering scale whose construction and mode of operation will be best understood from an examination of Figs. 10 to 15 inclusive. In a convenient form of construction said centering scale comprises two portions 36 and 37 which can be simultaneously slid back and forth with respect to each other. The scale 36 has its graduations reading in one direction from its zero point, while the scale 37 has its graduations reading in the other direction from its zero point, both zero points being always equidistant from the optic axis. Both of these scales are conveniently made from pieces of plane glass on which the scale markings are ruled or engraved.

The end portion of the telescoping tubular member 20 is provided with an enlarged neck or ring 38 having in its periphery an annular groove 39. Slidably mounted on the peripheral surface of the portion 38 is a sleeve 40 which constitutes an extension of a tubular eye piece 41. The sleeve 40 is connected to the enlargement 38 by a series of screws 42 sitting down in the periphery or annular recess 39. These screws serve to retain the sleeve 40 and the tubular eye piece 41 in position on the enlargement 38, while permitting said parts to be turned with respect to the telescoping member 20.

Between the end surface of the enlargement 38 and the end portion of the tubular eye piece 41, there is a space within which the scales 36 and 37 are accommodated. These scales are respectively carried by a pair of complementary plates 43 and 44 whose form is well shown in Fig. 12. The plates 43 and 44 are provided with complementary recesses within which the scales 36 and 37 are accommodated, so that the zero points of the two scales lie equidistant from the optic axis. However, upon shifting the two plates in opposite directions, the zero points of the scales may be simultaneously placed equal amounts on opposite sides of the optic axis as shown, for example, in Fig. 13.

Each of the plates 43 and 44 has on its rear surface a slot 45, as shown in Fig. 12, and in the end portion of the tubular eye piece there are mounted pairs of pins 46 working in said slots and serving to direct the plates 43 and 44 back and forth with a straight line movement. A ring 47 works between the plates 43 and 44 and the surface of the enlargement 38. Said ring carries a pair of surface projecting pins 48 and 49 corresponding to the plates 43 and 44, and said pins sit down into the surface slots 50 and 51 of the plates 43 and 44. With this arrangement, a rotation of the ring 47 will cause a simultaneous shifting of the plates 43 and 44 in opposite directions and in equal amounts. The ring 47 is conveniently rocked by a pin 52 which extends through a slotted opening in the sleeve 40.

The tubular piece 41 carries a lens 53 and a lens 54 whose distance from the scales 36 and 37 may be adjusted back and forth for accommodation to requirements of the observer's eye. Such adjustment is effected by mounting the lenses 53 and 54 within a telescoping member 55. Said telescoping member has a helical slot 56 into which projects a pin 57 from the tubular piece 41, so that by turning the tubular member 55, it will be slid in and out so as to adjust the distance of the lenses 53 and 54 from the scales 36 and 37.

As will be presently explained, a suitable rest is provided for positioning the patient's head at a definite point with respect to the tubular member 18. When the patient's eye is centered on the optic axis of the observation tube, the cornea will be illuminated by the lamp 29, so that an image of the cornea will be formed on the optic axis of the observation tube. If the cornea and the scales 36 and 37 be located at conjugate distances on opposite sides of the lens 21, then the image of the cornea will be brought to focus on the plane of the glass plates of the scales 36 and 37, so that the observer looking through the eye piece of the observation tube may observe said image and compare the position of the same with the markings on the scales.

The cornea of the eye of each individual patient is located at a definite distance behind the fore-head or other portion of the head. In order to insure accuracy of measurements, the linear divisions of the scales 36 and 37 are so arranged as to correspond to a corneal image formed thereon by the lens 21, of fixed magnification. For this purpose the scales 36 and 37 and the lens 21 are held at a fixed separation, which separation is conjugate to the predetermined separation of the lens 21 from the cornea of the eye 35. Longitudinal movement of the member 20, by means of the hand wheel 24, until the image of the cornea is sharply formed at the plane of the scales, enables the operator to realize this conjugate relation, and, therefore, fixed magnification of the corneal image in all cases.

When the patient's eye is directed along the observation tube, the attention of said eye may be attracted forcibly by the spot or beam of colored light coming through the aperture 30 and directed downwardly through the tube 26 and to the plate glass reflector 25. The eye 35 will observe said beam or spot of light apparently as coming from a distance along the optic axis of the observation tube, and the attention of the eye 35 will thus be centered along the optic axis of the observation tube. This will cause the image of the cornea to be centered with respect to the scales 36 and 37. The observer looking into the eye piece and observing the image of the patient's cornea on the scales 36 and 37 may then shift said scales to the position shown in Fig. 13, so that the zero points of the two scales will contact or touch the opposite sides of the periphery of the image of the cornea. This will give the observer a definite point of comparison which may be designated the centered position of the cornea of the eye under observation. It is to be observed at this point that said position of the cornea is obtained without respect to the visual axis of the other eye and without respect to the amount of abnormality existing in one or both eyes.

It is desired to next bring the visual axis of the other eye into parallelism with respect to the optic axis of the observation tube, and to then observe the amount of deviation or variation of the cornea of the eye under observation. For this purpose, we have provided the fixation tube previously mentioned. This fixation tube comprises a tubular member 58 carried by the bracket plate 59. In the front end of the tubular member 58 is a plus lens 60 and on the interior of the tubular member is a telescoping tube 61, one end of which has an aperture plate 62 with a small pin hole aperture 63. The telescoping member 61 has a rack 64 working in conjunction with the pinion 65 under the control of a hand wheel 66, so that the aperture plate may be moved back and forth into a definite position with respect to the lens 60. At the opposite end of the tubular member 58 is an opening 67 through which enters illumination from a lamp or the like 68. A shutter 69 pivoted at the point 70 serves as a convenient means for shutting off light from the lamp 68 when that is desired.

Fig. 8 shows in enlarged detail the hand wheel 66. The same is provided with peripheral graduations in both directions from zero, which graduations may conveniently be of the strength of the diopters. A fixed pointer 71 indicates the instantaneous position of the hand wheel, and thus indicates the dioptric strength of light entering the patient's eye. When the refractive error of the patient's eye is known by previous analysis or test, the hand wheel 66 may be turned to the proper position corresponding to said refractive error, so that the observer will thereupon have knowledge that the light rays coming from the lens 60 are of correct and proper strength to enter the patient's eye in such condition that the accommodation of the eyes will be fully relaxed. It will be understood that the said light rays enter the eye of the patient which is not under observation, said light rays being for the purpose of attracting the attention of the eye not under observation so as to bring the visual axis of said eye into a position parallel to the optic axis of the observation tube, and into coincidence with the optic axis of the fixation tube.

Inasmuch as the distance between eyes varies in different patients, means should be provided for adjusting the distance between the optic axes of the observation and fixation tubes to an amount exactly equal to the distance between the patient's eyes. This can be done by means of the bracket plate 59 which carries the fixation tube. Said bracket plate is mounted on a pair of rack bars 72 and 73 which project sidewise from a sleeve 74, which sleeve is rotatably mounted on the observation tube. A hand wheel 75 mounted on the rod 76 carrying the pinions 77 and 78 meshing with the racks 72 and 73 serves as a convenient means for shifting the bracket plate 59 back and forth. A scale plate 79 has its inner end 80 connected to the observation tube and its outer end resting on the surface of the fixation tube. A mark on the surface of the fixation tube serves as a convenient means for indicating on the scale the distance between the optic axes of the two tubes, so that the observer is thus enabled to adjust said distance to correspond with the known distance between the eyes of the patient.

Assuming that the distance between the optic axes of the observation and fixation tubes has been adjusted as explained, and assuming that the hand wheel 66 has been turned to the proper position to deliver light rays of a strength which will cause the accommodation of the patient's eyes to be fully relaxed, the shutter 32 may be closed, so as to cut off the colored beam of light from the observation tube, and the shutter 69 may be opened so as to expose the aperture 63 to the eye which is not under observation. The result will be that the eye not under observation will immediately fix upon the pin hole of the fixation tube and the visual axis of said eye will immediately swing into a position along the optic axis of the fixation tube. Simultaneously, by reason of cutting off the colored beam of light from the eye under observation, the attention of said eye will no longer be attracted, with the result that said eye will swing into position which it will naturally assume by reason of any abnormality of the recti muscles.

This swinging of the visual axis of the eye under observation away from the optic axis of the observation tube will cause a movement of the image of the cornea of the eye under observation away from the centered position on the scales 36 and 37. The direction of this movement may be horizontal or vertical or in some intermediate direction depending upon the cumulative abnormality of all of the recti muscles. The tubular piece 41 with the scales 36 and 37 may be turned about the optic axis of the observation tube until said scales lie in a direction parallel to the direction of movement of the image thus occasioned by the abnormality of the recti muscles. The amount by which it is necessary to turn the tubular eye piece will, therefore, be an indication of the direction of the cumulative error. Also this cumulative error will cause the image of the cornea to shift or move along the scales 36 and 37 into a position such as that shown in Fig. 14, and the amount of displacement thus indicated on the scales will be an indication of the amount of abnormality. It is quite evident that by properly arranging the markings on the scale, they will designate degrees of arc of movement of the visual axis, so that the amount of movement may be directly read in degrees.

In order to enable the observer to direct either of the patient's eyes along the observation tube and bring the other eye into position along the axis of the fixation tube, we have provided means for swinging the fixation tube to one side or the other of the observation tube. Said means takes the form of the sleeve 74 which is rotatably mounted on the fixed tubular member 18, the rack bars 72 and 73 being rigidly secured to said sleeve 74. In Fig. 5, we have shown by dotted lines the reverse position of the fixation tube with respect to the observation tube. In Figs. 1, 2 and 3 we have shown a simple form or arrangement of brackets and supports for holding the head of the patient rigidly in a fixed position during the various observations. This arrangement includes a base member 81 having a stand or post 82. A horizontal extension 83 on the post 82 carries a yoke or bifurcated member 84 having a pair of fore-head rests 85 and 86. The bifurcated member 84 is adjustable vertically in the extension 83 and may be secured in any desired position by means of a set-screw 87. A strap or the like 88 may be run around the back of the patient's head so as to hold the same rigidly against the forehead rests 85 and 86. Another bifurcated member 89 is adjustable vertically in the post 82 and may be secured in any desired position of vertical adjustment by means of a hand wheel 90 working a rack and pinion adjustment for the yoke member 89. A mouth piece consisting of a block of wood or the like 91 is carried by the yoke member 89, so that when the elevation of said yoke member has been exactly adjusted to the proper point, said mouth piece may be grasped by the teeth of the patient. In this way, the patient's head will be very rigidly held in desired position.

In order to bring the optic axis of the observation tube into direct line with the visual axis of the eye under observation, the observation tube may be shifted back and forth sidewise. For this purpose, we have mounted the observation tube upon a plate 92 working in a bracket 93 on the upper end of the vertically adjustable pillar 94. A rack and pinion adjustment including the hand wheel 95 enables the observer to shift the plate carrying the observation tube sidewise. The elevation of the plate 92 and of the observation tube can be adjusted vertically by means of another rack and pinion adjustment 96, whereby the pillar 94 may be raised and lowered with respect to the post 97 of the stand 81.

We have previously explained that, in order to test each eye independently, the observer may ascertain the extreme angle of fixation of the eye in each direction. This may be done by attracting the attention of said eye by the use of a convenient object, and then swinging said object out farther and farther, meantime observing the image of the cornea of the eye, until it is finally ascertained that the eye will not fixedly follow any further swinging of the object. A convenient form of such object is an incandescent lamp. We have, therefore, illustrated an incandescent lamp 98 carried by a post 99 mounted on a bracket 100, which bracket is swingingly carried on the post 97. This bracket may be swung clear around from one side of the instrument to the other and pass the eye piece end of the observation tube.

It will be understood that the lamp 29 serves not only to illuminate the aperture 30, but also serves to illuminate the cornea of the eye, so that a visible image of said cornea will be formed at the plane of the scales 36 and 37.

While we have herein shown and described only a single form of instrument embodying the features of our invention, still it will be understood that we do not limit ourselves to said form, except as we may do so in the claims.

We claim:

1. The method of testing the cumulative abnormalities of the recti muscles of the human eyes which consists in first causing one of the eyes to direct its visual axis in a given direction, then ascertaining the position of the image of the cornea of said eye, then causing the other eye to direct its visual axis in a direction parallel to the direction first mentioned, the first mentioned eye being relaxed, and finally observing the direction and amount of deviation of the image of the cornea of the first mentioned eye at such time.

2. The method of testing the cumulative abnormalities of the recti muscles of the human eyes which consists in ascertaining the exact position of the image of the cornea of one of the eyes when the visual axis of said eye lies in a known direction, thereafter relaxing both of the eyes, thereafter causing the visual axis of the other eye to lie in a direction parallel to the first mentioned direction, and finally ascertaining the amount and direction of movement of the image of the cornea of the first mentioned eye away from the position of said image first ascertained.

3. The method of testing the cumulative abnormalities of the recti muscles of the human eyes which consists in causing one of the eyes to relax, directing the visual axis of said eye in a known direction, and observing the amount and direction of deviation of the image of the cornea of the other eye from the known position of said image when the visual axis of said eye lies in a direction parallel to the direction first mentioned.

4. The method of testing the cumulative abnormalities of the recti muscles of the human eyes which consists in directing the visual axis of one of the eyes in a given direction, and then ascertaining the amount and direction of deviation of the image of the cornea of the other eye away from the position of said image when the visual axis of that eye lies parallel to the visual axis of the first mentioned eye.

5. In an instrument of the class described, the combination of an observation tube, means for supporting the patient's head in a fixed position, means for centering the optic axis of the observation tube with respect to the visual axis of the eye under observation, means for illuminating the cornea of the eye under observation, a scale whereon the image of the cornea is projected, means for attracting the attention of the eye under observation, to thereby direct its visual axis along the optic axis of the observation tube, a fixation tube, means for separating the optic axis of the fixation tube a distance from the optic axis of the observation tube equal to the separation between the eyes of the patient, means for attracting the attention of the eye of the patient looking into the fixation tube, in a direction along the optic axis of said tube and while in relaxed position, means for simultaneously relaxing the first mentioned eye, and means for observing on the aforementioned scale the position of the image of the cornea of the eye looking into the observation tube at such time.

6. In an instrument of the class described, the combination of an observation tube, means for supporting the patient's head in fixed position, means for centering the optic axis of the observation tube with respect to the visual axis of the eye under observation, means for illuminating the cornea of the eye under observation, means for attracting the attention of the eye under observation to thereby direct the visual axis of said eye along the optic axis of the observation tube, a scale whereon the image of the cornea of the eye under observation is projected, means for observing the image of the cornea on said scale, a fixation tube, means for adjusting the same to thereby bring its optic axis into line with the visual axis of the other eye when said visual axis lies parallel to the optic axis of the observation tube, means for attracting the attention of said other eye along the optic axis of the fixation tube when said eye is relaxed, and means for simultaneously relaxing the first mentioned eye to thereby permit the visual axis of said eye to swing naturally away from the optic axis of the observation tube by reason of the presence of any abnormalities of the recti muscles.

7. In an instrument of the class described, the combination of an observation tube, means for supporting the head of the patient at a position relative to the observation tube such as to bring the visual axis of the eye under observation into coincidence with the optic axis of the observation tube, a scale within the observation tube whereon is projected the image of the cornea of the eye under observation, means for directing the visual axis of the eye under observation along the optic axis of the observation tube, a fixation tube, means for adjusting the fixation tube with respect to the observation tube into such position as to bring the optic axis of the fixation tube into coincidence with the visual axis of the other eye when said visual axis lies parallel to the optic axis of the observation tube, and means for attracting the attention of said other eye to thereby cause its visual axis to lie along the optic axis of the fixation tube while said eye is relaxed.

8. In an instrument of the class described, the combination of an observation tube, means for supporting the head of a patient in fixed position relative to the observation tube to thereby bring the visual axis of the eye under observation into coincidence with respect to the optic axis of the observation tube, a scale within the observation tube whereon the image of the cornea of the eye under observation is projected, means for illuminating the cornea of said eye, and means for viewing the image formed on the scale.

9. In an instrument of the class described, the combination of an observation tube, means for supporting the head of the patient in such position relative to the observation tube as to bring the visual axis of the eye under observation into coincidence with the optic axis of the observation tube, a scale within the observation tube whereon is projected the image of the cornea of the eye under observation, means for illuminating the eye under observation, means for viewing the image on the scale, and means for attracting the attention of the eye under observation to thereby cause its visual axis to coincide with the optic axis of the observation tube.

10. In an instrument of the class described, the combination of an observation tube, means for supporting a patient's head in such position as to bring the eye under observation into coincidence with the optic axis of the observation tube, means for illuminating the cornea of the eye under observation, a scale whereon is projected the image of the cornea of the eye under observation, and movable means for attracting the attention of the eye under observation to thereby cause said eye to move in a desired direction and thus cause the image of the cornea to travel across the surface of the scale.

11. In an instrument of the class described, the combination of means for supporting the head of the patient in fixed position, a lens, a scale mounted a fixed distance on one side of the standard lens, means for moving the standard lens and scale toward and from the head of the patient to thereby bring the scale and the cornea of the patient's eye into conjugate relationship with respect to said lens, and means for attracting the eye under observation to thereby cause the visual axis of said eye to coincide with the optic axis of the standard lens and scale.

12. In an instrument of the class described, the combination of an observation tube, means for supporting the head of a patient in position with the visual axis of one of the patient's eyes in coincidence with the optic axis of the observation tube, a scale whereon is projected an image of the cornea of the eye under observation, a fixed tube having its optic axis parallel to the optic axis of the observation tube, an object on the optic axis of the fixation tube, and means for adjusting said object along said optic axis for the purpose of spacing the object from the patient's eye such a distance as to cause said eye to be fully relaxed when viewing the object.

13. In an instrument of the class described, the combination of an observation tube, means for supporting a patient's head with one of his eyes in coincidence with the optic axis of the observation tube, a scale within the observation tube whereon is projected the image of the patient's eye, means for attracting the attention of the eye under observation to cause the visual axis of said eye to coincide with the optic axis of the observation tube, a fixation tube having its optic axis separated from the optic axis of the observation tube a distance equal to the separation between the eyes of the patient, an object lying on the optic axis of the fixation tube, and means for moving said object along said optic axis for the purpose of bringing the object to the position where the eye of the patient is fully relaxed.

14. In an instrument of the class described, the combination of means for positioning the head of the patient, a lens, a scale mounted a fixed distance on one side of the lens, means for moving the lens and scale toward and from the head of the patient to thereby bring the scale and the cornea of the patient's eye into conjugate relationship with respect to said lens, and means for attracting the eye under observation to thereby cause the visual axis of said eye to coincide with the optic axis of the lens and scale.

15. In an instrument of the class described, the combination of means for positioning the head of a patient, a lens, a scale adjacent to the lens, means for moving the lens and scale toward and from the head of the patient to thereby bring the scale and the cornea of the patient's eye into conjugate relationship with respect to the lens, and means for attracting the eye under observation to thereby cause the visual axis of the eye to coincide with the optic axis of the lens and scale.

CLILE C. ALLEN.
EDGAR J. GEORGE.

Copies of this patent may be obtained for five cents each, by addressing the "Commissioner of Patents, Washington, D. C."